United States Patent
Solomon et al.

(10) Patent No.: US 11,587,346 B2
(45) Date of Patent: Feb. 21, 2023

(54) DETECTING INK GESTURES BASED ON SPATIAL AND IMAGE DATA PROCESSING

(71) Applicant: Microsoft Technology Licensing, LLC, Redmond, WA (US)

(72) Inventors: Oz Solomon, Maple (CA); Oussama Elachqar, Seattle, WA (US); Sergey Aleksandrovich Doroshenko, Redmond, WA (US); Nima Mohajerin, Concord (CA); Badal Yadav, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 17/117,151

(22) Filed: Dec. 10, 2020

(65) Prior Publication Data
US 2022/0188542 A1 Jun. 16, 2022

(51) Int. Cl.
*G06V 30/32* (2022.01)
*G06V 40/20* (2022.01)
(Continued)

(52) U.S. Cl.
CPC .......... *G06V 30/36* (2022.01); *G06F 18/213* (2023.01); *G06V 30/347* (2022.01); *G06V 40/20* (2022.01)

(58) Field of Classification Search
None
See application file for complete search history.

(56) References Cited

U.S. PATENT DOCUMENTS 4,839,634 A * 6/1989 More .............. G06V 10/12
345/173
5,553,224 A 9/1996 Saund et al.
(Continued)

FOREIGN PATENT DOCUMENTS

| EP | 1335272 A2 | 8/2003 |
| EP | 1973063 A1 | 9/2008 |
| WO | 2014200736 A1 | 12/2014 |

OTHER PUBLICATIONS

Bishop, Christopher M., Markus Svensen, and Goeffrey E. Hinton. "Distinguishing text from graphics in on-line handwritten ink." Ninth International Workshop on Frontiers in Handwriting Recognition. IEEE, 2004. (Year: 2004).*
(Continued)

*Primary Examiner* — Michelle M Entezari

(57) ABSTRACT

Ink-processing technology is set forth herein for detecting a gesture that a user performs in the course of interacting with an ink document. The technology operates by identifying a grouping of ink strokes created by the user. The technology then determines whether the grouping expresses a gesture based on a combination of spatial information and image information, both of which describe the grouping. That is, the spatial information describes a sequence of positions traversed by the user in drawing the grouping of ink strokes using an ink capture device, while the image information refers to image content in an image produced by rendering the grouping into image form. The technology also provides a technique for identifying the grouping by successively expanding a region of analysis, to ultimately provide a spatial cluster of ink strokes for analysis.

20 Claims, 7 Drawing Sheets

(51) Int. Cl.
*G06K 9/62* (2022.01)
*G06F 18/213* (2023.01)

(56) References Cited

U.S. PATENT DOCUMENTS

| | | | |
|---|---|---|---|
| 6,903,751 | B2 | 6/2005 | Saund et al. |
| 7,370,288 | B1 | 5/2008 | Simmons et al. |
| 11,074,403 | B1 | 7/2021 | Yost |
| 2003/0156145 | A1 | 8/2003 | Hullender et al. |
| 2004/0141648 | A1* | 7/2004 | Dodge ............... G06F 3/04883 382/188 |
| 2005/0044106 | A1 | 2/2005 | Duncan et al. |
| 2005/0175245 | A1 | 8/2005 | Sutanto et al. |
| 2006/0061776 | A1 | 3/2006 | Chen et al. |
| 2006/0085740 | A1 | 4/2006 | Ye et al. |
| 2006/0147117 | A1 | 7/2006 | Wakeam et al. |
| 2006/0188162 | A1 | 8/2006 | Szilagyi et al. |
| 2006/0210163 | A1* | 9/2006 | Garside ............... G06F 3/04883 382/186 |
| 2006/0210172 | A1 | 9/2006 | Sutanto et al. |
| 2006/0271580 | A1 | 11/2006 | Ye et al. |
| 2008/0232690 | A1 | 9/2008 | Saund et al. |
| 2008/0260241 | A1 | 10/2008 | Ye et al. |
| 2009/0262074 | A1* | 10/2009 | Nasiri ............... A63F 13/211 345/158 |
| 2014/0164352 | A1 | 6/2014 | Denninghoff |
| 2014/0361983 | A1* | 12/2014 | Dolfing ............... G06V 30/32 345/156 |
| 2016/0232204 | A1 | 8/2016 | Zholudev et al. |
| 2016/0274761 | A1 | 9/2016 | Ruiz et al. |
| 2017/0262700 | A1* | 9/2017 | Iskander ............ G06F 3/04842 |
| 2017/0285914 | A1 | 10/2017 | Ellbogen et al. |
| 2022/0187981 | A1 | 6/2022 | Solomon et al. |
| 2022/0188541 | A1 | 6/2022 | Elachqar et al. |
| 2022/0188542 | A1 | 6/2022 | Solomon et al. |

OTHER PUBLICATIONS

Bhat, Akshay, and Tracy Hammond. "Using Entropy to Distinguish Shape Versus Text in Hand-Drawn Diagrams." IJCAI. vol. 9. 2009. (Year: 2009).*

Qi, Yuan, Martin Szummer, and Thomas P. Minka. "Diagram structure recognition by bayesian conditional random fields." 2005 IEEE Computer Society Conference on Computer Vision and Pattern Recognition (CVPR'05). vol. 2. IEEE, 2005. (Year: 2005).*

Rampalli, et al., "Fusion of Complementary Online and Offline Strategies for Recognition of Handwritten Kannada Characters," available at http://mile.ee.iisc.ac.in/publications/softCopy/DocumentAnalysis/RAKESH_AGR_J.UCS.pdf, accessed on Mar. 21, 2022, version of paper in J.UCS, Journal of Universal Computer Science, vol. 17, No. 1, 2011, 13 pages.

Zhang, et al., "Online and Offline Handwritten Chinese Character Recognition: A Comprehensive Study and New Benchmark," in Cornell University's arXiv repository, arXiv1606.05763v1 [cs.CV], preprint submitted to Pattern Recognition, Jun. 18, 2016, 21 pages.

PCT Search Report and Written Opinion for International Application No. PCT/US2021/061307, dated Mar. 23, 2022, 12 pages.

Ye, et al., "Grouping Text Lines in Freeform Handwritten Notes," in Proceedings of the Eight International Conference on Document Analysis and Recognition, 2005, 5 pages.

Wang, et al., "Parsing Ink Annotations on Heterogeneous Documents," in Proceedings of the Third Eurographics Conference on Sketch-Based Interfaces and Modeling, Sep. 2006, 8 pages.

Ronneberger, et al., "U-Net: Convolutional Networks for Biomedical Image Segmentation," arXiv:1505.04597v1 [cs.CV], May 18, 2015, 8 pages.

He, et al., "Deep Residual Learning for Image Recognition," arXiv:1512.03385v1 [cs.CV], Dec. 10, 2015, 12 pages.

Agafonkin, Vladimir, "A dive into spatial search algorithms: Searching through millions of points in an instant," available at https://blog.mapbox.com/a-dive-into-spatial-search-algorithms-ebd0c5e39d2a, Medium, Apr. 27, 2017, 12 pages.

"R-tree," Wikipedia article, available at https://en.wikipedia.org/wiki/R-tree, accessed on Nov. 27, 2020, 9 pages.

Microsoft WORD document, example of double-click, triple-click, and quadruple-click behavior in a typewritten text document in WORD program, WORD program provided by Microsoft Corporation of Redmond, Washington, example produced on Nov. 29, 2020, 2 pages.

PCT Search Report and Written Opinion in PCT/US2021/058503, dated Feb. 23, 2022, 15 pages.

Solomon, et al., "Selecting Content in Ink Documents using a Hierarchical Data Structure," U.S. Appl. No. 17/117,149 (a continuation of U.S. Appl. No. 17/117,149), filed Aug. 28, 2022, 64 pages.

* cited by examiner

OVERVIEW OF THE FORMATION OF A SUBSET OF INK STROKES 502

RECEIVE A PARTICULAR INK STROKE MOST RECENTLY DRAWN BY THE USER USING AN INK CAPTURE DEVICE, WITHIN THE INK DOCUMENT.
504

IDENTIFY A SPATIAL CLUSTER OF INK STROKES FOR ANALYSIS THAT INCLUDES AT LEAST THE PARTICULAR INK STROKE.
506

IDENTIFY A SPATIAL SCOPE OF ANALYSIS THAT ENCOMPASSES THE PARTICULAR INK STROKE.
508

EXTEND THE SPATIAL SCOPE OF ANALYSIS.
510

IDENTIFY ANY OTHER INK STROKE THAT IS INCLUDED IN THE SPATIAL SCOPE OF ANALYSIS AS EXTENDED, AND ADD THE OTHER INK STROKE(S) TO THE SPATIAL CLUSTER OF INK STROKES.
512

REPEAT UNTIL TERMINATION CONDITION IS REACHED 514

CLASSIFY A GESTURE ASSOCIATED WITH THE SPATIAL CLUSTER OF INK STROKES BASED ON SPATIAL INFORMATION PERTAINING TO THE SPATIAL CLUSTER OF INK STROKES AND IMAGE INFORMATION PERTAINING TO THE SPATIAL CLUSTER OF INK STROKES, THE SPATIAL INFORMATION DESCRIBING A SEQUENCE OF POSITIONS TRAVERSED BY A USER IN DRAWING THE SPATIAL CLUSTER OF INK STROKES USING THE INK CAPTURE DEVICE, AND THE IMAGE INFORMATION PRODUCED BY RENDERING THE SPATIAL CLUSTER OF INK STORAGES INTO AN IMAGE.
516

FIG. 5

DETECTING INK GESTURES BASED ON SPATIAL AND IMAGE DATA PROCESSING

BACKGROUND

Some systems and applications allow a user to perform gestures in the course of interacting with a digital ink document. For example, an ink-processing application may allow a user to cross out a word in the ink document using a pen or finger. Upon recognizing this gesture, the ink-processing application can perform any kind of application-specific function, such as deleting the word, etc.

A satisfactory gesture-detecting engine should accurately detect gestures with low latency in a resource-efficient manner. These goals, however, may be technically challenging to achieve. For instance, an ink-processing application may have difficulty distinguishing between a gesture drawn with a pen and other content that the user does not intend to serve as a gesture. Further, the ink-processing application may run on a resource-constrained platform, such as a smartphone. A developer may have difficulty providing a viable gesture-detecting solution in such a resource-constrained environment.

SUMMARY

Ink-processing technology is described herein for detecting a gesture that a user performs in the course of interacting with an ink document. The technology operates by identifying a grouping of ink strokes created by the user that includes one or more ink strokes. The computing system then determines whether the grouping expresses a gesture based on a combination of spatial information and image information, both of which describe the grouping. More specifically, the spatial information describes a sequence of positions traversed by the user's writing implement in drawing the grouping of ink strokes, while the image information refers to image content in an image produced by rendering the grouping into image form.

According to one implementation, the technology analyzes the grouping by mapping the spatial information to a first feature embedding, and mapping the image information to a second feature embedding. The technology fuses these two feature embeddings together to produce a combined embedding, and then classifies the gesture on the basis of the combined embedding.

According to one implementation, the technology produces the grouping by generating a candidate spatial cluster of ink strokes that may (or may not) exhibit a meaningful gesture. In one approach, the technology identifies a region of analysis that includes an ink stroke last created by a user (referred to herein as a "last-created ink stroke"). The technology then successively expands the region of analysis to find any other ink strokes that lie near the last-created ink stroke, if any. The last-created ink stroke and any identified neighboring ink stroke(s) form the spatial cluster. A user need not complete a gesture in one uninterrupted effort, so the spatial cluster that is identified need not correspond to a temporally continuous set of ink strokes most recently created by the user.

According to one technical characteristic, the technology provides a mechanism for detecting gestures in ink documents that is both accurate and fast. The technology also makes efficient use of computing resources.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 is a flowchart that describes, in part, one illustrative manner of operation of the preprocessing system of FIG. 1.

Figure 1:
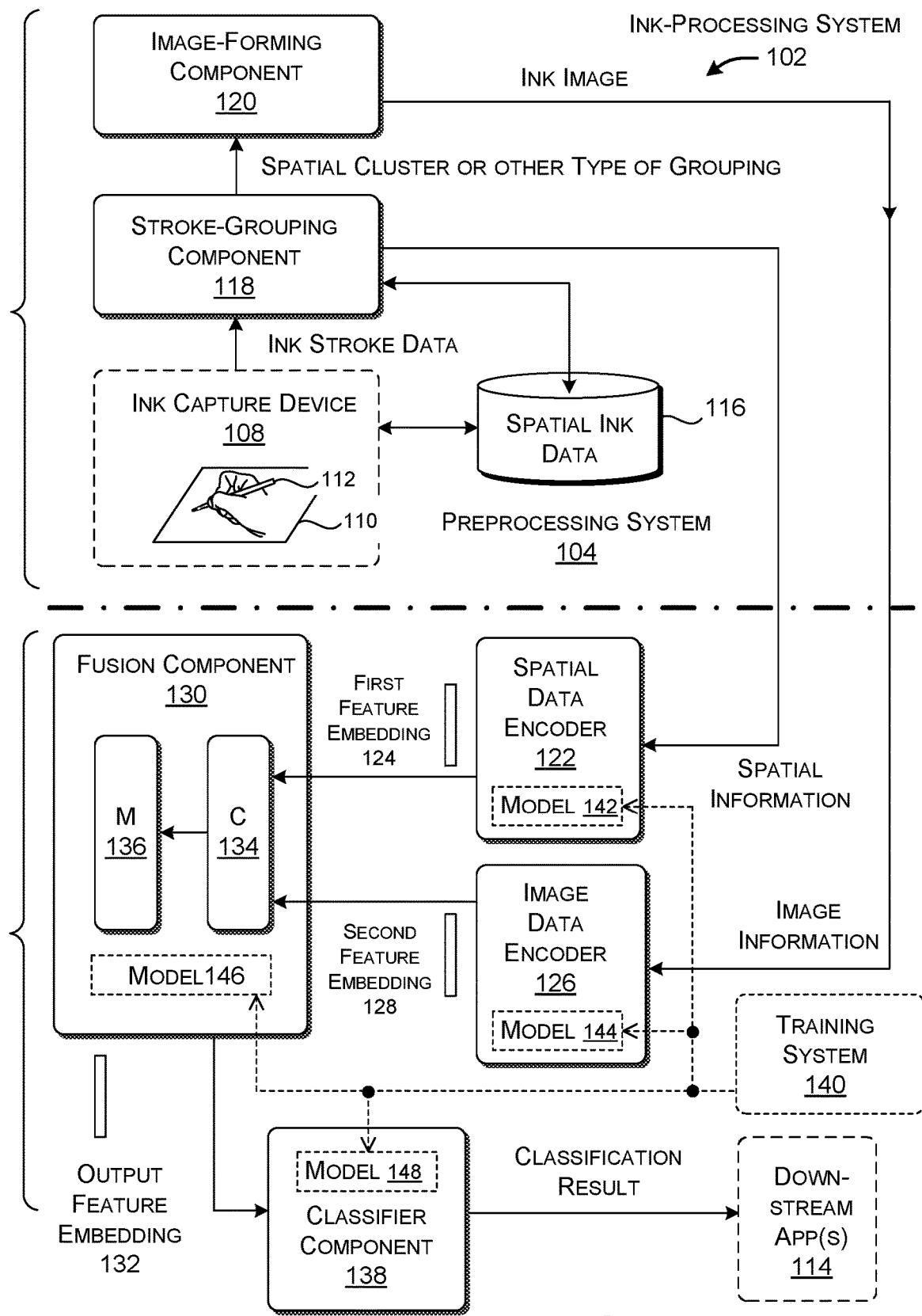
FIG. 1 shows an illustrative ink-processing system for detecting gestures in a digital ink document, which, in turn, includes a preprocessing system and a gesture-detecting system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes systems for detecting gestures in an ink document. Section B sets forth illustrative methods which explain the operation of the systems of Section A. And Section C describes illustrative computing functionality that can be used to implement any aspect of the features described in Sections A and B.

As a preliminary matter, the term "hardware logic circuitry" corresponds to technology that includes one or more hardware processors (e.g., CPUs, GPUs, etc.) that execute machine-readable instructions stored in a memory, and/or one or more configurable gate units (e.g., FPGAs) that perform operations using a task-specific collection of fixed and/or programmable logic gates. Section C provides additional information regarding one implementation of the hardware logic circuitry. In some contexts, each of the terms "component," "module," "engine," "system," and "tool" refers to a part of the hardware logic circuitry that performs a particular function or combination of functions.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further still, the descriptors "first," "second," "third," etc. are used to distinguish among different items, and do not imply an ordering among items, unless otherwise noted. Finally, the terms "exemplary" or "illustrative" refer to one implementation among potentially many implementations.

A. Illustrative Computing Systems

FIG. 1 shows an ink-processing system 102 that includes two component subsystems: a preprocessing system 104 and a gesture-detecting system 106. The preprocessing system 104 determines a spatially-defined cluster of ink strokes ("spatial cluster" for brevity) produced by a user using an ink capture device 108. A spatial cluster refers to a grouping of ink strokes that lie within an algorithm-defined vicinity of a last-created ink stroke. The gesture-detecting system 106 classifies a gesture that is expressed by the spatial cluster, if any. Each of these subsystems will be described below in turn.

At the outset, note that the particular kind of preprocessing system 104 can be used in combination with other types of gesture-detecting systems, not limited to the particular type of gesture-detecting system 106 described below. Similarly, the particular kind of gesture-detecting system 106 can be used in combination with other types of preprocessing systems, not limited to the particular type of preprocessing system 104 described below. For instance, the gesture-detecting system 106 can be more generally said to operate on a grouping of ink strokes, one example of which is the particular kind of spatial cluster generated by the preprocessing system 104. In still other cases, the gesture-detecting system 106 can be used in the absence of any type of preprocessing system. To facilitate explanation, however, most of the examples presented below will be framed in the illustrative context in which the preprocessing system 104 generates a spatial cluster.

Beginning with the preprocessing system 104, the ink capture device 108 corresponds to any kind of device that allows a user to create a digital ink document by making hand-drawn marks on a writing surface 110 using a writing implement of any type, such as a pen 112, a finger, etc. In one implementation, the writing surface 110 includes a touch-sensitive display that uses a display device in combination with a digitizer. The display device may be spatially co-extensive with the digitizer. Or the digitizer and the display device can overlap in part, but not in whole. In another implementation, the writing surface 110 corresponds to a digitizer that is separate from a display device. For example, the writing surface 110 may correspond to a digitizing pad that is physically separate from a display device on which the ink document is displayed. Still other implementations of the writing surface 110 are possible.

Without limitation, the display device can include a Liquid Crystal Display (LCD) device, an Organic Light-Emitting Diode (OLED) display device, an electronic paper display device (e.g., an electrophoretic display device, an electrowetting display device, etc.), a Cholesteric Liquid Crystal Display (ChLCD) device, a projection display device, and so on. The digitizer (not shown) detects the position of the pen 112 or other writing implement (such a finger) on its surface. The digitizer can use any technology to perform this task. In some implementation, the digitizer includes an array of sensing elements arranged over its surface that detect the presence of the writing implement when placed in proximity thereto. More generally, the digitizer can use any technology or combination of technologies to detect the writing implement, including resistive, capacitive, electromagnetic, optical, and/or acoustic technology.

When it is used, the pen 112 may correspond to a passive digital pen (also known as a stylus) or an active digital pen. In some implementations, the active digital pen can perform various functions, such as transmitting electromagnetic signals that are detected by the digitizer's sensing elements when the pen is placed in proximity to the digitizer. In addition, or alternatively, the active digital pen can sense electrical signals that are transmitted by digitizer. In addition, or alternatively, the active digital pen can sense the pressure with which the user applies the active pen to the writing surface 110. In addition, or alternatively, the active digital pen can transmit information that it collects to any destination device, such as the writing surface 110 itself.

In some implementations, a computing device incorporates the ink capture device 108 as an integral and physical part thereof. For example, the computing device corresponds to a smartphone having a touch-sensitive display device. Alternatively, a computing device is tethered to the ink capture device 108 via a cable, wireless connection, and/or any other communication mechanism. The computing device can also include components that implement the remainder of the ink-processing system 102 shown in FIG. 1, and described below. In addition, the computing device can host one or more down-stream applications 114 that consume the output of the ink-processing system 102. Alternatively, or in addition, one or more other computing devices (not shown) can host one or more applications that consume the output of the ink-processing system 102.

An illustrative downstream application can perform a document-editing operation in response to detecting an edit-related gesture performed by the user. For example, a user may create a gesture that involves lassoing (e.g., circling) a word in a sentence. Upon detecting this gesture, an application can annotate the word with one or more graphical controls (e.g., handlebars) that allow a user to subsequently move the word to another location or perform any other action on the word. In another case, a user may create a gesture that involves drawing a line through a word in a sentence. In response, an application can delete the word. In another case, a user may produce a gesture that involves adding an insert symbol (e.g., a caret and stem) between two words in a sentence, along with a written character or word in proximity to the stem stroke. In response, an application can insert the specified character or word into the sentence at a location designated by the caret. These examples are set forth here in the spirit of illustration, not limitation. Different devices and applications can define a custom set of gestures and resultant actions based on any environment-specific considerations.

In the terminology used herein, a digital ink stroke (or "ink stroke" for brevity) refers to a sequence of digital data points created by the user as the user moves a writing implement across the writing surface 110. Each ink stroke begins when the user applies the writing implement to the writing surface 110 (corresponding to a pen-down event). Each ink stroke ends when the user disengages the writing implement from the writing surface (corresponding to a pen-up event). In some implementations, a pen-down event corresponds to the case in which the user makes physical contact with the writing surface 110. In other cases, a pen-down event corresponds to the case in which the user moves the writing implement within a prescribed distance to the writing surface 110, but does not actually make contact with the writing surface 110.

A digital ink document (or "ink document" for brevity) refers to a document that is composed of one or more ink strokes. In some cases, an ink document is entirely composed of ink strokes. In other cases, an ink document can combine ink strokes with other content items that are not produced using the ink capture device 106, such as text composed of type characters (e.g., produced using a key input device or received from another source, etc.), images, etc.

The ink capture device 108 can record various data items that describe each ink stroke. For example, the ink capture device 108 can capture any combination of the following data items: a) an indication of a start and stop of the ink stroke, corresponding to pen-down and pen-up events; b) a series of position measurements, each position measurement describing the position of the writing implement on the writing surface 110 (e.g., by specifying x and y coordinates), or the change in position of the writing implement from a last-detected position (e.g., by specifying $\Delta x$ and $\Delta y$ measurements); c) a series of optional pressure measurements, each pressure measurement describing a pressure with which the user applied the writing implement to the writing surface 110; d) a series of time measurements, each time measurement describing a time at which a particular data point was captured, or the span of time since a last data point was captured (e.g., by specifying a $\Delta t$ value), and so on. Note, however, that the ink-processing system 102 is agnostic with respect to the particular ink stroke data captured by a particular manifestation of the ink capture device 108. In other words, the ink-processing system 102 can work with any type of ink capture device 108 regardless of the way that the ink capture device 108 expresses ink strokes. It is sufficient that the ink capture device 108 merely capture some information that describes the spatial trajectory of an ink stroke. For instance, the gesture-detecting system 106 can operate based on a stream of (x, y) readings and/or a stream of ($\Delta x$, $\Delta y$) readings, among other expressions of position. The ink capture device 108 stores the ink strokes that it captures in a data store 116, optionally along with any non-ink content in a document.

A stroke-grouping component 118 identifies a spatial cluster. A spatial cluster includes a last-created ink stroke in combination with zero, one, or more other ink strokes that lie nearby the last-created ink stroke in the ink document. As will be explained in greater detail below, the stroke-grouping component 118 applies an iterative algorithm to identify the ink strokes that compose a spatial cluster. As an introduction to that later explanation, the stroke-grouping component 118 is invoked after the user completes each ink stroke. The stroke-grouping component 118 then determines whether any other ink strokes are present within a region of analysis that includes the last-created stroke. If so, the stroke-grouping component 118 adds these other ink strokes to the spatial cluster. If at least one other ink stroke is found, the stroke-grouping component 118 repeats the above-described process one or more times with respect to an expanded region of analysis until no further ink stroke is found and/or until some other termination condition is reached.

From a high-level perspective, note that the resultant spatial cluster defines a spatially-meaningful set of ink strokes that may reveal that the user has performed a gesture. These ink strokes may correspond to a set of ink strokes that the user just created, but can also exhibit temporal discontinuities. For example, consider the case in which a user creates two ink strokes of an asterisk and then begins creating a separate doodle in another part of the ink document. Then suppose that the user returns to the asterisk to add a third stroke of the asterisk. The last-created ink stroke that invokes the operation of the stroke-grouping component 118 is the third ink stroke of the asterisk. The stroke-grouping component 118 will identify the first two ink strokes of the asterisk as appropriate members of a spatial cluster, effectively ignoring the strokes that the user has produced in the course of creating the doodle. In other words, the spatial cluster in this case exhibits a temporal discontinuity between the creation of the second and third ink strokes of the asterisk.

Upon identifying the spatial cluster, the stroke-grouping component 118 retrieves the ink strokes associated with the spatial cluster from the data store 116 and formulates an instance of spatial information based thereon. In one implementation, the spatial information includes a series of x and y positions that a user traverses in drawing the ink strokes that compose the spatial cluster. The spatial information can also include pen-down and pen-up event data to designate the respective beginnings and ends of the ink strokes that compose the spatial cluster. This example of spatial information is described in the spirit of illustration, not limitation. For instance, in another implementation, the spatial information can include a series of $\Delta x$ and $\Delta y$ readings. In another implementation, the spatial information can include time information, etc.

An image-forming component 120 renders the spatial cluster into an image, referred to as image information herein. That is, the image information represents the ink strokes in a spatial cluster using pixels, whereas the spatial information represents the ink strokes as a series of positions traversed by the user in drawing the ink strokes.

Now advancing to the bottom half of FIG. 1, the gesture-detecting system 106 determines whether each spatial cluster includes a recognizable gesture. It performs this task based on a combination of the spatial information (generated by the stroke-grouping component 118) and the image information (generated by the image-forming component 120).

A spatial data encoder 122 maps the spatial information to a first feature embedding 124 within a distributed feature space, while an image data encoder 126 maps the image information into a second feature embedding 128 within the same feature space. In one non-limiting implementation, the spatial data encoder 122 can be implemented by a first convolutional neural network, while the image data encoder 126 is implemented by a second convolutional neural network. Each convolutional neural network can be implemented by series of layers, including one or more convolutional layers. Each neural network can also include any combination of one or more pooling layers, one or more activation functions (such as ReLU functions), one or more residual connections, and so on. In these implementations, the first feature embedding 124 and the second feature embedding 128 may correspond to two respective low-dimensioned vectors within the same vector space.

In some implementations, a convolutional layer moves an n×m kernel across an instance of input information received by the convolutional layer. In some implementations, at each position of the kernel, the convolutional layer generates the dot product of the kernel values with the underlying values of the input information. Overall, a series of convolutional layers can perform the above-described operation for respective different kernels having different machine-learned kernel values. Each kernel corresponds to a different pattern. In early layers of processing, a convolutional layer may apply a kernel that serves to identify relatively primitive patterns in the input information. In later layers, a convolutional layer may apply a kernel that finds more complex features. A pooling layer performs some kind of aggregating/summarizing operation with respect to the values of input information demarcated by a window, such as by identifying and storing the maximum value in the window, generating and storing the average of the values in the window, etc. A residual connection copies input data that is fed to a processing layer (or layers) and adds that input data to output data generated by the processing layer(s).

Other implementations can use a different type of neural network to implement each encoder (122, 126), such as a transformer neural network. Alternatively, the spatial data encoder 122 can extract a discrete set of features to describe the spatial information based on one or more rules, and the image data encoder 126 can extract another discrete set of features to describe the image information based on one or more rules. This implementation can optionally omit the use of a neural network or other machine-trained model.

A fusion component 130 processes the first feature embedding 124 and the second feature embedding 128, to generate an output feature embedding 132. More specifically, a combination (C) component 134 first combines the first feature embedding 124 and the second feature embedding 128, to produce a combined feature embedding. The combination component 134 can perform this task in different implementation-specific ways, such as by concatenating the first feature embedding 124 and the second feature embedding 128, element-wise summing, averaging, or max-pooling the elements of these two feature embeddings (124, 128), or performing a combination of element-wise operations on the elements of these two feature embeddings (124, 128). A mapping component ("M") 136 then maps the combined embedding to the output feature embedding 132. In one non-limiting implementation, the mapping component 136 can perform this operation using a neural network, such as one or more fully-connected (FC) neural network layers.

Finally, a classifier component 138 maps the output feature embedding 132 into a classification result. The classification result identifies the most likely identity of the gesture expressed by the spatial cluster, if any. One type of gesture, for instance, may correspond to a text-lassoing gesture that a user performs by drawing a "lasso" around a piece of text in the ink document. The classifier component 138 can perform its classification operation using any kind of classification mechanism, such as a softmax operation, a Support Vector Machine (SVM) classifier, another neural network of any type (such as a transformer-type neural network), etc. As stated above, one or more downstream applications 114 can perform any type of environment-specific operations based on the classification result.

The architecture described above is set forth in the spirit of illustration, not limitation. For instance, in another implementation, the gesture-detecting system 106 can combine the spatial information and the image information together as a first stage to produce combined input information. The gesture-detecting system 106 can then use one or more machine-trained models to map the combined input information into the output feature embedding.

A training system 140 produces models (142, 144, 146) that govern the operation of the spatial data encoder 122, image data encoder 126, and the fusion component 130. Each model corresponds a set of machine-trained parameter values. While FIG. 1 shows that the three models (142, 144, 146) are discrete entities, note that the training system 140 can produce a single model corresponding to a single set of parameter values that governs the operation of the spatial data encoder 122, the image data encoder 126, and the fusion component 130. The classifier component 138 can also optionally use a machine-trained model 148 produced by the training system 140.

The training system 140 can perform its training task based on a set of training spatial clusters and associated ink images. A positive training example includes a spatial cluster that is tagged with a classification that accurately represents the classification of the gesture (if any) expressed by the spatial cluster. A negative training example includes a spatial cluster that is tagged with a classification that does not correctly reflect the gesture expressed by the spatial cluster. According to one loss function, the training system 140 can generate its models (142, 144, 146, 148) by iteratively increasing the number of accurate predictions that the models (142, 144, 146, 148) produce, and iteratively decreasing the number of inaccurate predictions. The training system 140 can perform this iterative training task using any technique, such as stochastic gradient descent, with or without drop-out.

The ink-processing system 102 is advantageous because, when run on some computing platforms, it achieves high accuracy (e.g., accuracy above 99 percent) with low latency (e.g., by recognizing gestures in about one millisecond). The ink-processing system 102 achieves this result by performing both analysis in the spatial and image domains, fusing the results of these two modes of analyses, and then classifying a gesture based on the results of the fusion. As recognized by the inventors, an attempt to achieve high accuracy in either domain by itself may require the use of a large and complex model. Such a model might compromise the latency of the model, and require the use of more computing resources compared to the solution shown in FIG. 1. An attempt to achieve low latency in either domain by itself may result in a smaller model. Such a model, however, might compromise accuracy. The ink-processing system 102 overcomes these problems through its joint analysis on spatial information and image information. In other words, it can be said that the spatial and image analysis synergistically interact in the ink-processing system 102 to achieve both high accuracy and low latency.

Figure 2:
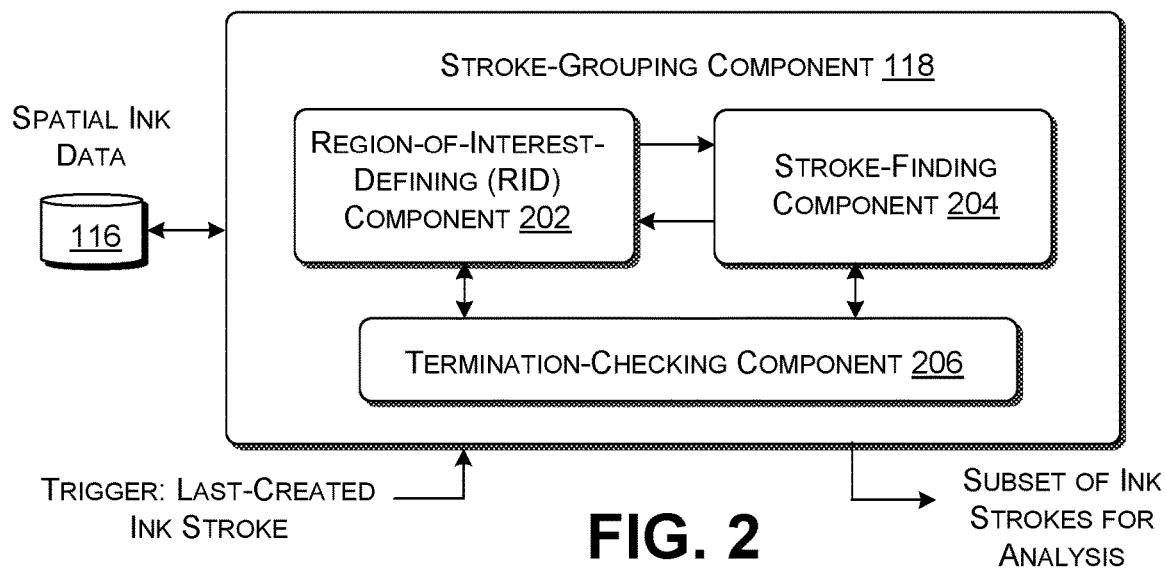
FIG. 2 shows an illustrative implementation of a grouping component, which is part of the preprocessing system of FIG. 1. The grouping component identifies a grouping of ink strokes (such as a spatial cluster) for analysis by the gesture-detecting system of FIG. 1.

FIG. 2 shows one implementation of the stroke-grouping component 118 of FIG. 1. To repeat, the purpose of the stroke-grouping component 118 is to identify a subset of ink strokes for analysis that may reveal that the user has performed a gesture. In one non-limiting implementation, the subset of ink strokes constitutes a spatial cluster. As a minimum, the spatial cluster includes the last-created ink stroke drawn by the user. The purpose of the stroke-grouping component 118 is to determine whether the user has previously created any other ink strokes that lie near the last-created ink stroke and which form part of a single gesture. In many cases, a spatial cluster will contain two or more ink strokes that the user has most-recently created. But as noted above, there is no necessity that this holds true in all cases. For example, the user may begin work on a first drawing object, turn his or her attention to the creation of a second drawing object, and then return to finish the first drawing object. The spatial cluster associated with these drawings will therefore include at least one temporal discontinuity.

The stroke-grouping component 118 may include a region-of-interest-defining (RID) component 202, a stroke-finding component 204, and a termination-checking component 206. The RID component 202 defines a region in the ink document that is to be searched for one or more ink strokes that belong to a spatial cluster. As will be clarified in the examples to follow, the RID component 202 initially draws the region of analysis so that it encompasses at least the last-created ink stroke. The RID component 202 can subsequently expand the region of analysis one or more times in an attempt to find additional ink strokes to add to the spatial cluster. In one implementation, the region of analysis defined by the RID component 202 corresponds to a bounding box, but it can more generally correspond to any type of envelope. The RID component 202 can expand the bounding box in its width and/or height dimension.

The stroke-finding component 204 can examine a region of analysis for ink strokes using any type of spatial search algorithm, such as, without limitation, the R-tree algorithm, the K-d tree algorithm, a K nearest neighbor (kNN) algorithm, etc. To accommodate these searches, the preprocessing system 104 expresses the ink strokes in an ink document using a spatial data structure. For instance, in the case of the R-tree algorithm, the preprocessing system 104 uses a hierarchical tree to represent the spatial organization of ink strokes in the ink document. The R-tree algorithm uses a branch-and-bound approach to efficiently navigate the tree in search of ink strokes that lie within a defined vicinity of one or more other identified ink strokes.

The termination-checking component 206 determines whether the search for ink strokes should be terminated for a particular region of analysis being formed. The termination-checking component 206 can reach this conclusion in response to different circumstances. In one case, the termination-checking component 206 terminates the search when the stroke-finding component 204 concludes that no further ink strokes can be found in the current region of analysis. In another case, the termination-checking component 206 ends the search when the region of analysis has become too large, e.g., meaning that its area exceeds an environment-specific threshold value. In another case, the termination-checking component 206 ends the search when the region of analysis has a shape that exceeds one or more threshold values. For example, the termination-checking component 206 can end the search when the width of a bounding box exceeds a prescribed threshold value, or when the height of the bounding box exceeds a prescribed threshold value, or when an aspect ratio (the ratio of width to height) of the bounding box exceeds a prescribed threshold value, etc.

Figure 3:
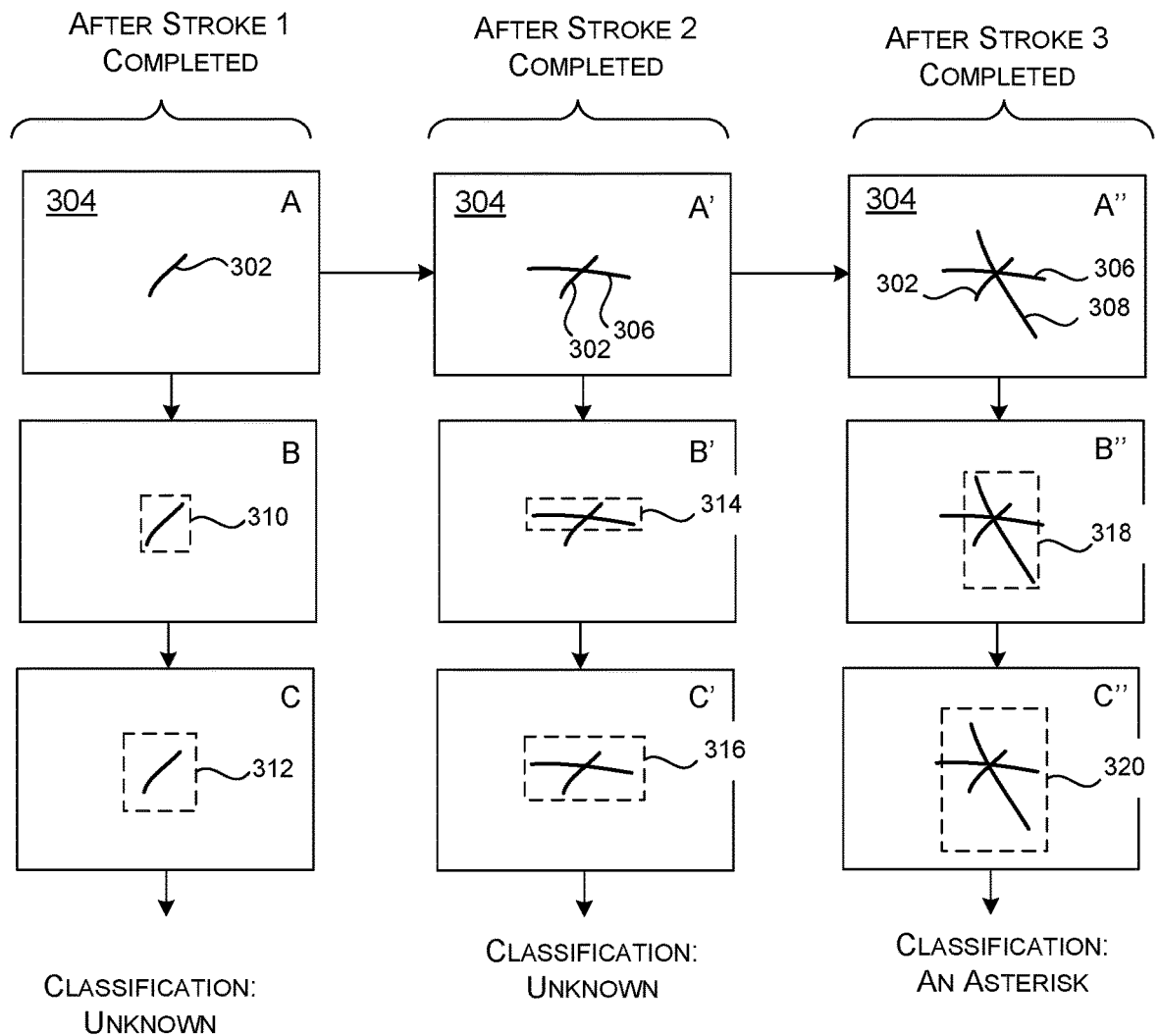
FIGS. 3 and 4 show two examples of the operation of the grouping component of FIG. 2.

FIG. 3 shows an example of the operation of the stroke-grouping component 118. More specifically, the left-most column of FIG. 3 shows a sequence of steps that the stroke-grouping component 118 performs after the user completes a first ink stroke 302 in an ink document 304 (a small portion of which is shown in FIG. 3). The middle column of FIG. 3 shows a sequence of steps that the stroke-grouping component 118 performs after the user completes a second ink stroke 306. And the right-most column of FIG. 3 shows a sequence of steps that the stroke-grouping component 118 performs after the user completes a third ink stroke 308.

Starting with the left-most column, at stage A, the user creates the first ink stroke 302. At this point in time, the spatial cluster includes just the first ink stroke 302. At stage B, the RID component 202 defines a bounding box 310 around the first ink stroke 302. (Note that the stroke-grouping component 118 does not actually display the bounding box 310; FIG. 3 illustrates the bounding box 310 to facilitate understanding of the internal operation of the stroke-grouping component 118.) Note that the RID component 202 initially defines the bounding box 310 so that it is just large enough to encompass the first ink stroke 302, irrespective of other ink strokes that may already lie in the vicinity of the first ink stroke 302. At stage C, the RID component 202 expands the bounding box 310 to produce an updated bounding box 312. The bounding box 312 defines a region of analysis. More specifically, at this stage, the RID component 202 expands the bounding box 310 by a predetermined amount, e.g., by expanding its width by a first predetermined amount and its height by a second predetermined amount. The RID component 202 performs this expansion independent of the possible existence (or nonexistence) or any other ink strokes in the vicinity of the first ink stroke 302. However, note that a particular implementation of preprocessing system 104 can select the amount(s) by which it expands the bounding box 310 at this stage based on the characteristics (e.g., size) of the gestures it is expecting to find. For instance, a large-sized gesture may warrant expanding the bounding box 310 by a commensurately large amount to be able to detect the possible nearby parts of this gesture.

In stage D (not shown in FIG. 3), the stroke-finding component 204 determines whether any other ink strokes intersect the bounding box 312. The stroke-finding component 204 performs this task using any type of graphical search algorithm, such as the R-tree algorithm. At the present time, there is no other ink stroke that intersects the bounding box 312. This finding causes the termination-checking component 206 to register a termination event. In response, in a stage E (not shown), the preprocessing system 104 defines the spatial cluster as consisting of just a single ink stroke, that is, the ink stroke 302. In a stage F (not shown), the preprocessing system 104 feeds this single-stroke spatial cluster to the gesture-detecting system 106. In a stage G, the gesture-detecting system 106 maps the spatial cluster to a classification result that may indicate that the spatial cluster does not contain any recognizable cluster.

In stage A' of the second column, the user creates the second ink stroke 306. At this point in time, the spatial cluster being formed includes just the second ink stroke 306 (because the first ink stroke 302 has not been identified and added at this time). In stage B', the RID component 202 defines a bounding box 314 that is just large enough to enclose the second ink stroke 306. In stage C', the RID component 202 expands the bounding box 314 to produce a new bounding box 316. Again, the RID component 202 expands the bounding box 314 by a fixed amount, irrespective of the existence or nonexistence of any other ink strokes in the vicinity of the second ink stroke 306. In stage D' (not shown), the stroke-finding component 204 determines that the first ink stroke 302 intersects the bounding box 316. In response, in a stage E', the stroke-finding component 204 adds the first ink stroke 302 to the spatial cluster being formed, so that the spatial cluster now includes the first ink stroke 302 and the second ink stroke 306.

As will be clarified below in FIG. 4, the stroke-grouping component 118 can successively expand a region of analysis until it finds no further ink strokes that are meaningfully part of the spatial cluster being formed. In the example described immediately above, the stroke-grouping component 118 will find that there are no further ink strokes that should be added to the spatial cluster. This conclusion prompts the preprocessing system 104 to send the two-stroke spatial cluster to the gesture-detecting system 106. Assume that the gesture-detecting system 106 processes the spatial cluster to conclude that the spatial cluster still does not contain a recognizable gesture. This conclusion, however, depends on the set of possible gestures used in a particular environment. For example, in another environment, an application may define an "X" symbol as a recognizable gesture, in which case the gesture-detecting system 106 may conclude that the two-stroke spatial cluster contains this gesture.

In stage A" of the third column, the user creates the third ink stroke 308. At this point in time, the spatial cluster being formed includes just the third ink stroke 308. In stage B", the RID component 202 defines a bounding box 318 that is made large enough to just enclose the third ink stroke 308. In stage C", the RID component 202 expands the bounding box 318 by a predetermined amount to produce a new bounding box 320; once again, this expansion is performed independent of the existence or nonexistence of any other ink stroke(s) in the vicinity. In stage D" (not shown), the stroke-finding component 204 determines that both the previously-created first ink stroke 302 and the second ink stroke 306 intersect the bounding box 320. In response, in a stage E", the stroke-finding component 204 adds the first ink stroke 302 and the second ink stroke 306 to the spatial cluster being formed, so that the spatial cluster now includes the first ink stroke 302, the second ink stroke 306, and the third ink stroke 308.

The stroke-grouping component 118 can successively expand a region of analysis until it finds no further ink strokes that are meaningfully part of the spatial cluster being formed. In this case, the stroke-grouping component 118 will find that there are no further ink strokes that should be added to the spatial cluster. This conclusion prompts the preprocessing system 104 to send the three-stroke spatial cluster to the gesture-detecting system 106. Assume that the gesture-detecting system 106 now concludes that the spatial cluster expresses an asterisk gesture. A downstream application can then take any application-specific action in response to this finding, such as replacing the asterisk with a computer-generated icon, etc.

The user can continue with the above-described process by adding one or more strokes to the asterisk. After each such added stroke, the ink-processing system 102 will repeat the above steps. Further, after each added ink stroke, the ink-processing system 102 will increase its level of confidence that the user has created a recognizable asterisk gesture.

In conclusion to the above explanation of FIG. 3, the stroke-grouping component 118 adopts a stateless algorithm in which it constructs a new spatial cluster after the user produces each new ink stroke. In another implementation, the stroke-grouping component 118 can preserve information regarding a previously-defined spatial cluster, and then modify that information when the user chooses to add to the spatial cluster. For example, in the second column, the stroke-grouping component 118 can determine that the second ink stroke 306 intersects the first ink stroke 302. It can then retrieve the spatial cluster that has already been formed when processing the first ink stroke 304, add the second ink stroke 306 to it, and then determine whether the region of analysis defined by this two-member spatial cluster includes any other ink strokes.

Figure 4:
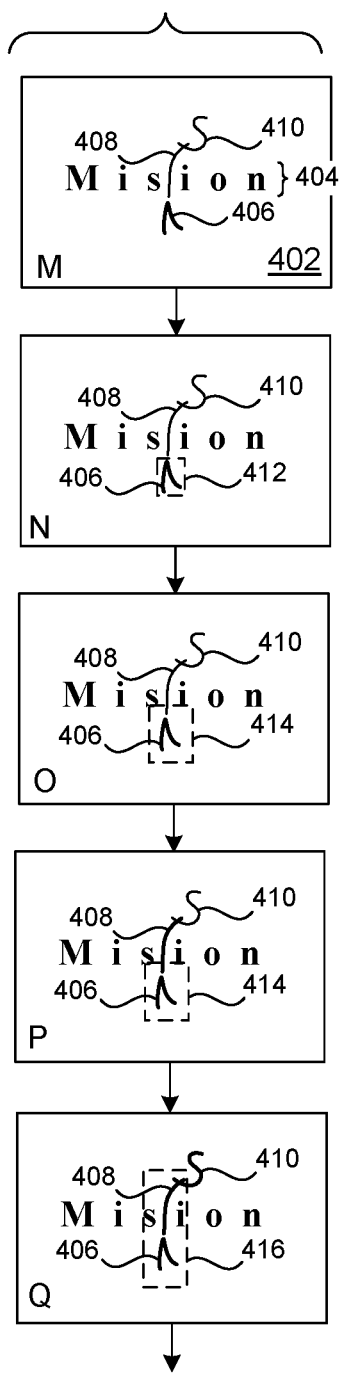

FIG. 4 shows another example of the operation of the stroke-grouping component 118 that is more complex than the example of FIG. 3. Assume here that an ink document 402 includes the misspelled typed word "Mision" 404 (which is not necessarily itself an ink-created object). The user is in the process of adding an insert gesture that indicates that the word should contain an additional letter "s". More specifically, at a stage M, assume that the user is completing a caret stroke 406 of the Insert gesture. Assume that the user has already created a stem stroke 408 of this gesture. Further assume that the user has already written the letter "s" 410 in proximity to the stem stroke 408. At this stage, however, the stroke-grouping component 118 defines a spatial cluster that only includes the caret stroke 406, because this is the last-created stroke.

In stage N, the RID component 202 defines a bounding box 412 that is made large enough to just enclose the caret stroke 406. In stage O, the RID component 202 expands the bounding box 412 by a predetermined amount to produce a new bounding box 414, without regard to the existence or nonexistence of other ink strokes in the vicinity. In stage P, the stroke-finding component 204 searches the expanded bounding box 414 to determine that the previously-created stem stroke 408 intersects the bounding box 414. In response to this finding, the stroke-finding component 204 adds the stem stroke 408 to the spatial cluster being formed.

At stage Q, the RID component 202 expands the bounding 414 of stage O to include both the caret stroke 406 and the stem stroke 408, to produce a new region of analysis 416. In a next stage (not shown), the stroke-finding component 204 determines whether any ink stroke intersects the stem stroke 408. It discovers that the letter "s" 410 intersects the stem stroke 408. In response to this finding, the stroke-finding component 204 adds the letter "s" 410 to the spatial gesture being formed.

Although not shown, the stroke-grouping component 118 can repeat the above-described operation one or more times until no further new ink stroke is found or until some other termination condition is reached. For instance, in a next stage, the RID component 202 redefines the region of analysis to include the caret stroke 406, the stem stroke 408, and the letter "s" 410. The stroke-finding component 204 now determines that there is no additional stroke that intersects the letter "s" 410. At this time, the termination-checking component 206 registers a termination event. The preprocessing system 104 next sends the three-stroke spatial cluster to the gesture-detecting system 106. Assume that the gesture-detecting system 106 correctly interprets this spatial cluster as an instruction to insert the letter "s" 410 at a particular juncture in the misspelled word "Mision" 404. An application can then carry out this instruction.

In summary, in the above-described approach, the stroke-grouping component 118 establishes an expanded bounding box 414 around the first-created caret stroke 406. The stroke-grouping component 118 determines all other ink strokes that intersect this expanded bounding box 414, upon which it finds just the stem stroke 408. The stroke-grouping component 118 then determines whether any other ink strokes intersect with the existing ink strokes in the spatial cluster, upon which it finds the letter "s" 410. Note that the expansion operation that happens at stage O is a context-free expansion operation, in which the bounding box is expanded by a fixed amount. But subsequent expansion operations are governed by the ink stroke(s) that are discovered. For example, at a later stage, the RID component 202 defines a region of analysis to encompass at least the caret 406 and stem 408 when attempting to determine whether any currently-unknown ink stroke intersects the caret 406 and stem 408. In other words, the scope of analysis at this stage is chosen based on the spatial trajectories of the caret 406 and stem 408.

The above algorithm can be varied in different ways. In one variation, assume that the region of analysis 416 shown in stage Q corresponds to a bounding box, and is subsequently referred to as such. Instead of determining whether there are any ink strokes that intersect the stem stroke 408, as described above, the stroke-finding component 204 can search the bounding box 416 to determine whether there are any ink strokes that intersect the bounding box 416. This is a more permissive intersection requirement than requiring that a new ink stroke intersect existing ink strokes. In the example of FIG. 4, the stroke-finding component 204 will discover that the letter "s" 410 does in fact intersect the expanded bounding box 416.

In an alternative next-stage (not shown), the RID component 202 expands the bounding box 416 again to encompass the letter "s" 410, to establish a yet larger bounding box. In a next stage (not shown), the stroke-finding component 204 determines that no further ink strokes intersect the latest expanded bounding box. In response, the stroke-grouping component 118 terminates its search for new ink strokes.

To repeat a point made earlier, the ink-processing system 102 can be used without the particular preprocessing system 104 described above, or without any type of preprocessing system. For example, the stroke-grouping component 118 can define a spatial cluster as containing a predetermined number of ink strokes (e.g., five ink strokes) that the user last created. This solution can produce acceptable results in many cases, but may produce less than ideal results in those instances in which a user does not create the ink strokes of a gesture all at once. In yet another implementation, the stroke-grouping component 118 can define a spatial cluster as all strokes that lie within a predetermined distance of the last-created ink stroke. In another implementation, the stroke-grouping component 118 can use a machine-trained model to determine the scope of a spatial cluster, given the triggering event in which a user creates a new ink stroke. That is, such a machine-trained model can examine each candidate ink stroke that lies within a predetermined distance of the last-created ink stroke to provide a binary classification indicating whether or not it should be added to the spatial cluster. Still other implementations are possible.

Alternatively, or in addition, the ink-processing system 102 can send the last-created ink stroke to the gesture-detecting system 106 without performing any analysis on it using the preprocessing system 104. This manner of operation is effective in classifying single-stroke gestures, such as a lasso gesture. This manner of operation is more generally sufficient for those ink-processing systems and applications that only use single-stroke gestures. As used herein, any reference to a "grouping" of ink strokes is intended to encompass the case in which the group has a single ink stroke. Further, a process of identifying an ink stroke may involve just selecting a last-created ink stroke.

When used, the above-described preprocessing system 104 increases the efficiency of the ink-processing system 102. For instance, the preprocessing system 104 allows the ink-processing system 102 to avoid processing the entire ink document each time a user creates a new ink stroke. This behavior, in turn, improves the latency of the ink-processing system 102 and reduces its consumption of computing resources. The preprocessing system 104 also intelligently selects the subset of ink strokes that define a cluster, which increases the accuracy of the subsequent gesture-detecting operation.

B. Illustrative Processes

Figure 6:
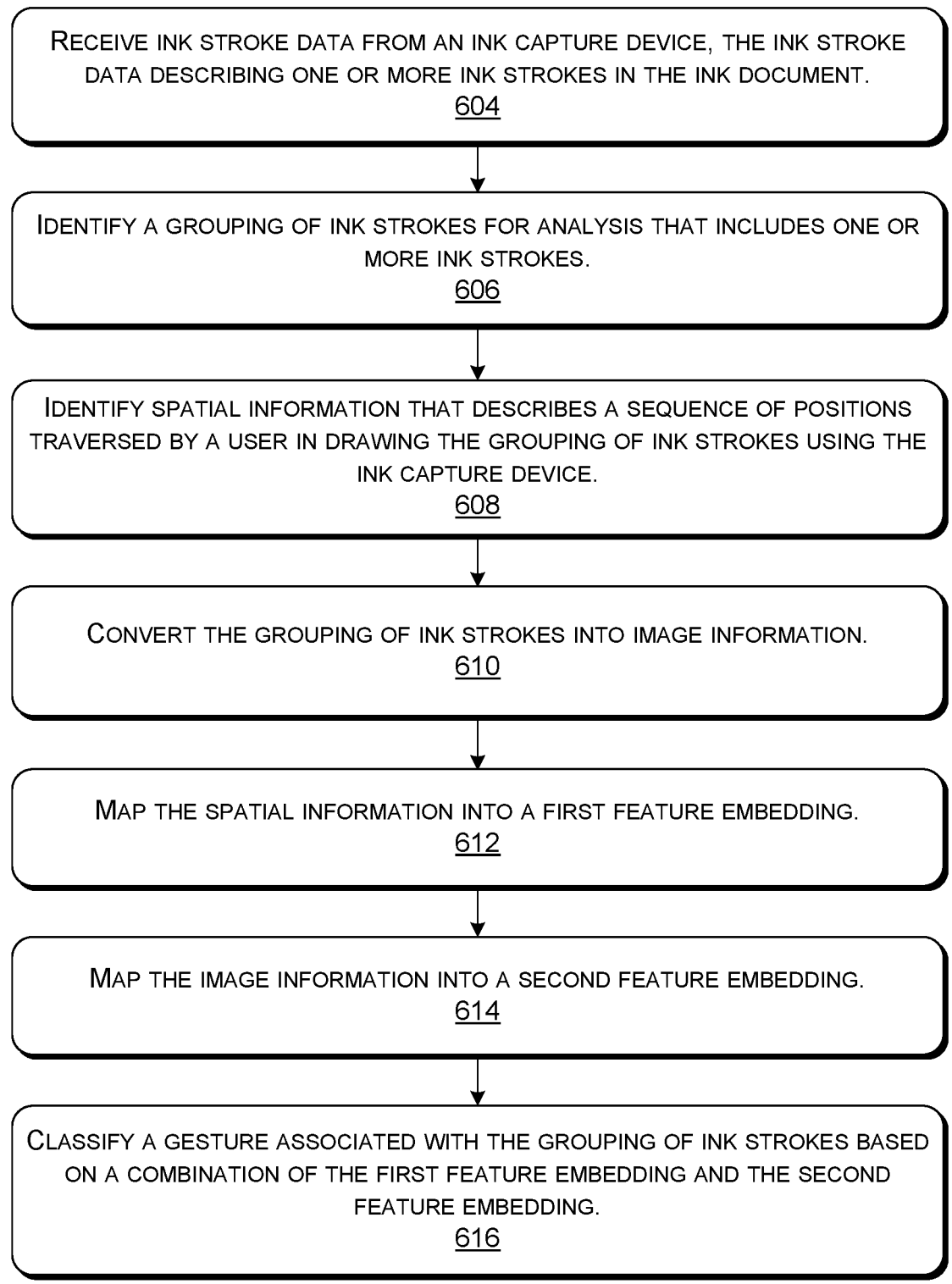
FIG. 6 is a flowchart that describes, in part, an illustrative manner of operation of the gesture-detecting system of FIG. 1.

FIGS. 5 and 6 show processes (502, 602) that explain the operation of the ink-processing system 102 of Section A in flowchart form. Since the principles underlying the operation of the ink-processing system 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIG. 5 shows a process 502 that describes, in part, one illustrative manner of operation of the preprocessing system 104 of FIG. 1. In block 504, the preprocessing system 104 receives a particular ink stroke most recently drawn by the user using an ink capture device 108, within an ink document. In block 506, the preprocessing system 104 identifies a spatial cluster of ink strokes for analysis that includes at least the particular ink stroke. To perform block 506, the preprocessing system 104, in block 508, identifies a spatial scope of analysis that encompasses the particular ink stroke. In block 510, the preprocessing system 104 extends the spatial scope of analysis. In block 512, the preprocessing system 104 identifies any other ink stroke that is included in the spatial scope of analysis as extended, and adds the other ink stroke(s) to the spatial cluster of ink strokes. A loop 514 indicates that blocks 508, 510, and 512 can be repeated until a termination condition is reached. In a first execution of the expansion operation (in block 510), the preprocessing system 104 extends the region of analysis without reference to any other ink strokes in the vicinity of the particular ink stroke. Later executions of this operation may expand the region of analysis in a manner that takes account for all the ink strokes discovered so far. In block 516, the gesture-detecting system 106 classifies a gesture associated with the spatial cluster of ink strokes based on spatial information pertaining to the spatial cluster of ink strokes and image information pertaining to the spatial cluster of ink strokes. The spatial information describes a sequence of positions traversed by a user in drawing the spatial cluster of ink strokes using the ink capture device. The image information is produced by rendering the spatial cluster of ink storages into an image FIG. 6 shows a process 602 that describes, in part, one illustrative manner of operation of the gesture-detecting system 106 of FIG. 1. In block 604, the ink-processing system 102 receives ink stroke data from the ink capture device 108, the ink stroke data describing one or more ink strokes in the ink document. In block 606, the ink-processing system 102 identifies a grouping of ink strokes for analysis, such as the kind of spatial cluster generated via the procedure 502 of FIG. 5. In another implementation, the grouping includes N ink strokes, such as the last N ink strokes created by the user. In one example, N is 1, corresponding to the very last ink stroke produced by the user, or the last ink stroke that meets environment-specific filter criteria (e.g., by ignoring a very short ink stroke). In block 608, the ink-processing system 102 identifies spatial information that describes a sequence of positions traversed by a user in drawing the grouping of ink strokes using the ink capture device. In block 610, the ink-processing system 102 converts the grouping of ink strokes into image information. In block 612, the ink-processing system 102 maps the spatial information into a first feature embedding. In block 614, the ink-processing system 102 maps the image information into a second feature embedding. In block 616, the ink-processing system 102 classifies a gesture associated with the grouping of ink strokes based on a combination of the first feature embedding and the second feature embedding.

C. Representative Computing Functionality

Figure 7:
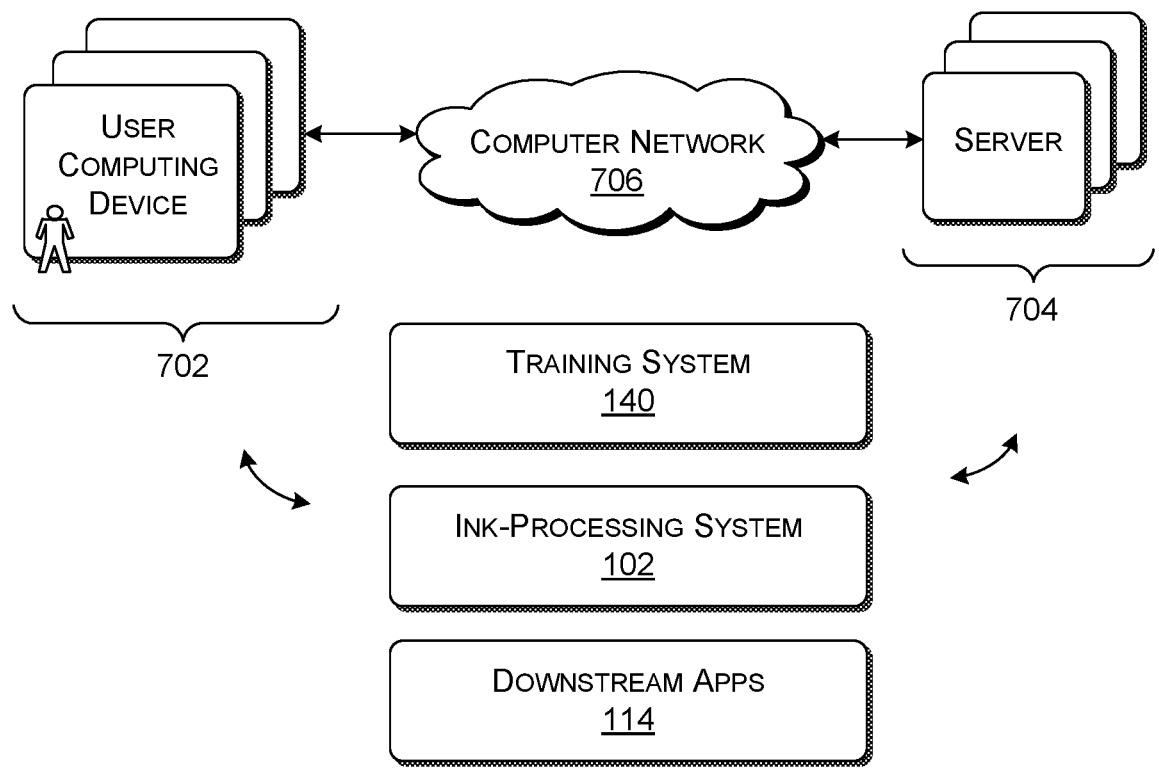
FIG. 7 shows illustrative computing equipment that can be used to implement the ink-processing system of FIG. 1.

FIG. 7 shows an example of computing equipment that can be used to implement any of the functions summarized above. The computing equipment includes a set of user computing devices 702 coupled to a set of servers 704 via a computer network 706. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 706 can be implemented as a local area network, a wide area network (e.g., the Internet), one or more point-to-point links, or any combination thereof.

FIG. 7 also indicates that any of the training system 140, the ink-processing system 102, and the downstream application(s) 114 can be spread across the user computing devices 702 and/or the servers 704 in any manner. For instance, in one case, the ink-processing system 102 is entirely implemented by each user computing device. But in another implementation, any aspect of the functions performed by the ink-processing system 102 can instead, or in addition, be performed by one or more remote servers. Although not shown in FIG. 7, each user computing device incorporates a local instance of the ink capture device 108. But here too, aspects of the processing performed by the ink capture device 108 can be allocated to a remote server or servers and/or one or more other local devices.

Figure 8:
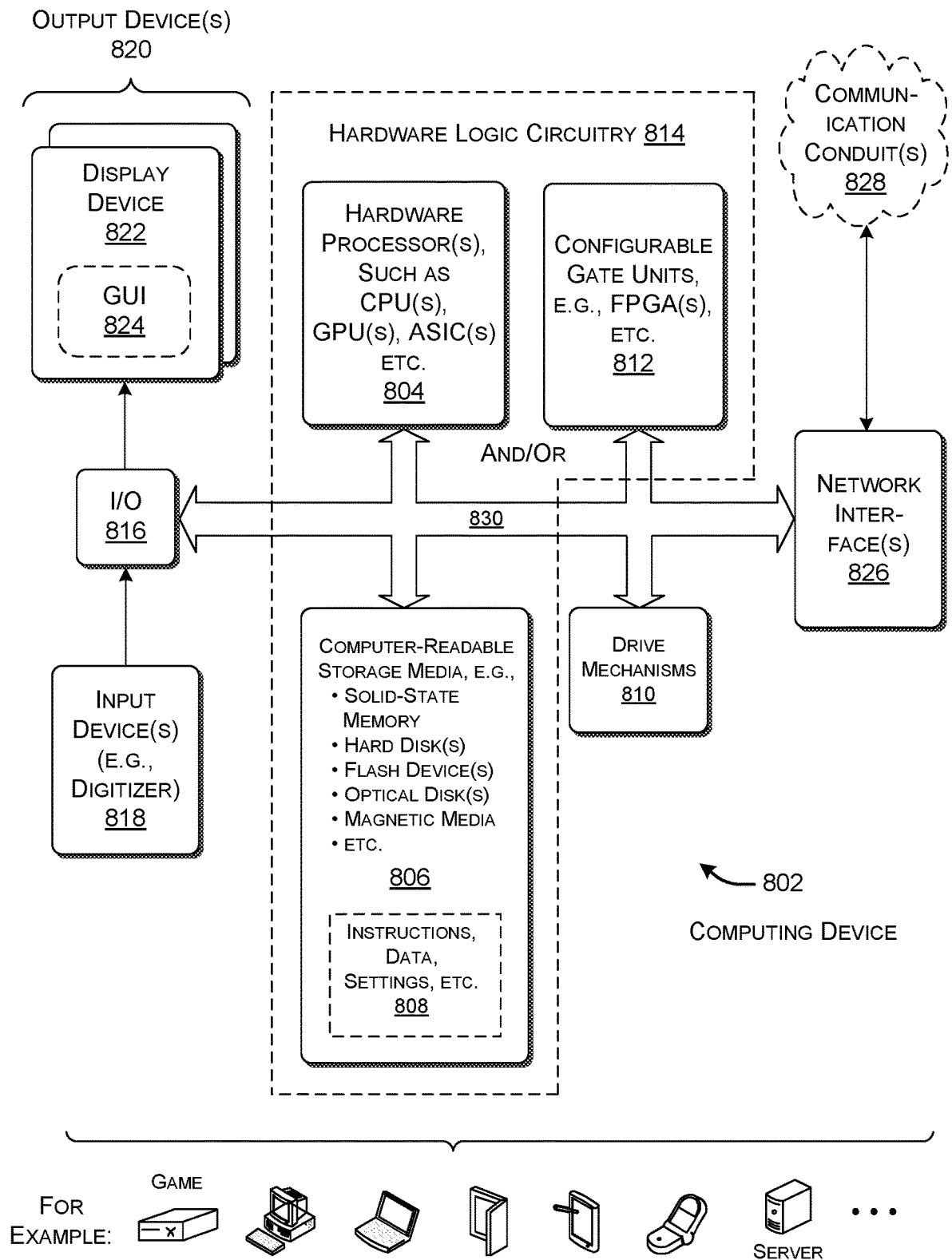
FIG. 8 shows an illustrative type of computing device that can be used in the computing equipment of FIG. 7.

FIG. 8 shows a computing device 802 that can be used to implement any aspect of the computing equipment shown in FIG. 7. For instance, the type of computing device 802 shown in FIG. 8 can be used to implement any user computing device or any server shown in FIG. 7. In all cases, the computing device 802 represents a physical and tangible processing mechanism.

The computing device 802 can include one or more hardware processors 804. The hardware processor(s) 804 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 802 can also include computer-readable storage media 806, corresponding to one or more computer-readable media hardware units. The computer-readable storage media 806 retains any kind of information 808, such as machine-readable instructions, settings, data, etc. Without limitation, the computer-readable storage media 806 may include one or more solid-state devices, one or more magnetic hard disks, one or more optical disks, magnetic tape, and so on. Any instance of the computer-readable storage media 806 can use any technology for storing and retrieving information. Further, any instance of the computer-readable storage media 806 may represent a fixed or removable unit of the computing device 802. Further, any instance of the computer-readable storage media 806 may provide volatile or non-volatile retention of information.

The computing device 802 can utilize any instance of the computer-readable storage media 806 in different ways. For example, any instance of the computer-readable storage media 806 may represent a hardware memory unit (such as Random Access Memory (RAM)) for storing transient information during execution of a program by the computing device 802, and/or a hardware storage unit (such as a hard disk) for retaining/archiving information on a more permanent basis. In the latter case, the computing device 802 also includes one or more drive mechanisms 810 (such as a hard drive mechanism) for storing and retrieving information from an instance of the computer-readable storage media 806.

The computing device 802 may perform any of the functions described above when the hardware processor(s) 804 carry out computer-readable instructions stored in any instance of the computer-readable storage media 806. For instance, the computing device 802 may carry out computer-readable instructions to perform each block of the processes described in Section B.

Alternatively, or in addition, the computing device 802 may rely on one or more configurable gate units 812 to perform operations using a task-specific collection of logic gates. For instance, the configurable gate unit(s) 812 may include a fixed configuration of hardware logic gates, e.g., that are created and set at the time of manufacture, and thereafter unalterable. Alternatively, or in addition, the configurable gate unit(s) 812 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 8 generally indicates that hardware logic circuitry 814 includes any combination of the hardware processor(s) 804, the computer-readable storage media 806, and/or the configurable gate unit(s) 812. That is, the computing device 802 can employ any combination of the hardware processor(s) 804 that execute machine-readable instructions provided in the computer-readable storage media 806, and/or one or more configurable gate unit(s) 812 that perform operations using a fixed and/or programmable collection of hardware logic gates. More generally stated, the hardware logic circuitry 814 corresponds to one or more hardware logic units of any type(s) that perform operations based on logic stored in and/or otherwise embodied in the hardware logic unit(s).

In some cases (e.g., in the case in which the computing device 802 represents a user computing device), the computing device 802 also includes an input/output interface 816 for receiving various inputs (via input devices 818), and for providing various outputs (via output devices 820). Illustrative input devices include at least a digitizer, and may also include a keyboard, voice detection mechanism, etc. One particular output mechanism may include a display device 822 and an associated graphical user interface presentation (GUI) 824. Illustrative types of display devices where described above in Section A. The computing device 802 can also include one or more network interfaces 826 for exchanging data with other devices via one or more communication conduits 828. One or more communication buses 830 communicatively couple the above-described units together.

The communication conduit(s) 828 can be implemented in any manner, e.g., by a local area computer network, a wide area computer network (e.g., the Internet), point-to-point connections, etc., or any combination thereof. The communication conduit(s) 828 can include any combination of hardwired links, wireless links, routers, gateway functionality, name servers, etc., governed by any protocol or combination of protocols.

FIG. 8 shows the computing device 802 as being composed of a discrete collection of separate units. In some cases, the collection of units may correspond to discrete hardware units provided in a computing device chassis having any form factor. FIG. 8 shows illustrative form factors in its bottom portion. In other cases, the computing device 802 can include a hardware logic unit that integrates the functions of two or more of the units shown in FIG. 1. For instance, the computing device 802 can include a system on a chip (SoC or SOC), corresponding to an integrated circuit that combines the functions of two or more of the units shown in FIG. 8.

The following summary provides a non-exhaustive set of illustrative examples of the technology set forth herein.

According to a first example, a computing system for processing an ink document is described. The computing system includes hardware logic circuitry that has one or more hardware processors and/or one or more configurable gate units. The hardware logic circuitry is configured to perform the operations of: receiving ink stroke data from an ink capture device, the ink stroke data describing one or more ink strokes in the ink document; identifying a grouping of ink strokes for analysis that includes one or more ink strokes; identifying spatial information that describes a sequence of positions traversed by a user in drawing the grouping of ink strokes using the ink capture device; converting the grouping of ink strokes into image information; mapping the spatial information into a first feature embedding; mapping the image information into a second feature embedding; and classifying a gesture associated with the grouping of ink strokes based on a combination of the first feature embedding and the second feature embedding.

According to a second example, the grouping is a spatial cluster of ink strokes that omits at least one ink stroke that the user produced between a first-captured ink stroke in the spatial cluster and a last-captured ink stroke in the spatial cluster.

According to a third example, the operation of identifying a grouping of ink strokes includes: receiving a particular ink stroke most recently drawn by the user, and adding the particular ink stroke to the grouping of ink strokes; identifying a spatial scope of analysis that encompasses the particular ink stroke; extending the spatial scope of analysis; and identifying any other ink stroke that is included in the spatial scope of analysis as extended, and adding the aforementioned any other ink stroke to the grouping of ink strokes.

According to a fourth example, relating to the third example, the operation of identifying a grouping of ink strokes further includes repeating the operation of extending the spatial scope and identifying any other ink stroke until no additional ink stroke is identified or until another termination condition is reached.

According to a fifth example, relating to the fourth example, one termination condition is reached when a size of the scope of analysis achieves at least a prescribed area and/or a prescribed aspect ratio.

According to a sixth example, relating to the third example, the spatial scope of analysis is a bounding box that encompasses the particular ink stroke. The operation of extending is performed by expanding at least one dimension of the bounding box.

According to a seventh example, the operation of identifying a grouping includes identifying a set of ink strokes last-created by the user.

According to an eighth example, relating to the seventh example, the grouping has only a single ink stroke.

According to a ninth example, the operation of mapping the spatial information into a first feature embedding uses a first neural network provided by the hardware logic circuitry. The operation of mapping the image information into a second feature embedding uses a second neural network provided by the hardware logic circuitry.

According to a tenth example, the operation of classifying includes: combining the first feature embedding and the second feature embedding to produce a combined feature embedding; mapping the combined embedding to an output feature embedding using a neural network provided by the hardware logic circuitry; and identifying a classification for the gesture based on the output feature embedding.

According to an eleventh example, relating to the tenth example, the operation of combining is performed by concatenating the first feature embedding and the second feature embedding.

According to a twelfth example, a method is described for processing an ink document. The method includes: receiving a particular ink stroke most recently drawn by a user using an ink capture device, within the ink document; identifying a grouping of ink strokes for analysis that includes at least the particular ink stroke; identifying spatial information that describes a sequence of positions traversed by the user in drawing the grouping of ink strokes using the ink capture device; converting the grouping of ink strokes into image information; mapping the spatial information into a first feature embedding; mapping the image information into a second feature embedding; and classifying a gesture associated with the grouping of ink strokes based on a combination of the first feature embedding and the second feature embedding.

According to a thirteenth example, relating the twelfth example, the operation of identifying a grouping of ink strokes includes: identifying a spatial scope of analysis that encompasses the particular ink stroke; extending the spatial scope of analysis; and identifying any other ink stroke that is included in the spatial scope of analysis as extended, and adding the aforementioned any other ink stroke to the grouping of ink strokes.

According to a fourteenth example, relating to the thirteenth example, the spatial scope of analysis is a bounding box that encompasses the particular ink stroke. The operation of extending is performed by expanding at least one dimension of the bounding box.

According to a fifteenth example, relating to the twelfth example, the operation of mapping of the spatial information into a first feature embedding uses a first neural network. The operation of mapping of the image information into a second feature embedding uses a second neural network.

According to a sixteenth example, relating to the twelfth example, the operation of classifying includes: combining the first feature embedding and the second feature embedding to produce a combined feature embedding; mapping the combined feature embedding to an output feature embedding using a neural network; and identifying a classification for the gesture based on the output feature embedding.

According to a seventeenth example, a computer-readable storage medium for storing computer-readable instructions is described. The computer-readable instructions, when executed by one or more hardware processors, perform a method that includes: receiving a particular ink stroke most recently drawn by a user using an ink capture device, within an ink document; and identifying a spatial cluster of ink strokes for analysis that includes at least the particular ink stroke. The operation of identifying includes: identifying a spatial scope of analysis that encompasses the particular ink stroke; extending the spatial scope of analysis; identifying any other ink stroke that is included in the spatial scope of analysis as extended; and adding the aforementioned any other ink stroke to the spatial cluster of ink strokes. The method further includes classifying a gesture associated with the spatial cluster of ink strokes based on spatial information pertaining to the spatial cluster of ink strokes and image information pertaining to the spatial cluster of ink strokes. The spatial information describes a sequence of positions traversed by the user in drawing the spatial cluster of ink strokes using the ink capture device. The image information is produced by rendering the spatial cluster of ink storages into an image.

According to an eighteenth example, relating to the seventeenth example, the method further includes repeating the operation of extending the spatial scope and identifying any other ink stroke until no additional ink stroke is identified or until another termination condition is reached.

According to a nineteenth example, relating to the seventeenth example, the spatial scope of analysis is a bounding box that encompasses the particular ink stroke. The operation of extending is performed by expanding at least one dimension of the bounding box.

According to a twentieth example, relating to the seventeenth example, the method further includes mapping the spatial information into a first feature embedding, and mapping the image information into a second feature embedding. The operation of classifying operates by classifying the gesture based on a combination of the first feature embedding and the second feature embedding.

A twenty-first example corresponds to any combination (e.g., any logically consistent permutation or spatial cluster) of the above-referenced first through twentieth examples.

A twenty-second example corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system for detecting a gesture that a user performs in a course of interacting with an ink document, comprising:

hardware logic circuitry including one or more hardware processors and/or one or more configurable gate units, configured to perform the operations of:

receiving a first ink stroke most recently drawn by the user, and adding the first ink stroke to a first grouping of ink strokes that initially includes just the first ink stroke;

identifying a first spatial scope of analysis that is large enough to encompass the first ink stroke;

extending the first spatial scope of analysis;

identifying any other ink stroke that is included in the first spatial scope of analysis as extended, and adding said any other ink stroke to the first grouping of ink strokes;

generating a first classification result based on the first grouping of ink strokes;

receiving a second ink stroke drawn by the user, and adding the second ink stroke to a second grouping of ink strokes that initially includes just the second ink stroke;

identifying a second spatial scope of analysis that is large enough to encompass the second ink stroke;

extending the second spatial scope of analysis;

identifying any other ink stroke that is included in the second spatial scope of analysis as extended, and adding said any other ink stroke identified by extending the second spatial scope as extended to the second grouping of ink strokes;

generating a second classification result based on the second grouping of ink strokes, independent of the first classification result; and performing an operation corresponding to a particular gesture for a case in which a corresponding classification result indicates that a corresponding group of ink strokes contains the particular gesture.

2. The computing system of claim 1, wherein the first grouping of ink strokes is a first spatial cluster of ink strokes that omits at least one ink stroke that the user produced between a first-captured ink stroke in the first spatial cluster and a last-captured ink stroke in the first spatial cluster.

3. The computing system of claim 1, wherein the method further comprises repeating said extending the first spatial scope of analysis and identifying any other ink stroke in the first spatial scope of analysis as extended until no additional ink stroke is identified or until another termination condition is reached.

4. The computing system of claim 3, wherein one termination condition is reached when a size of the first spatial scope of analysis achieves a prescribed threshold value.

5. The computing system of claim 1,
wherein the first spatial scope of analysis after entry of the first ink stroke is a bounding box that encompasses the first ink stroke, and
wherein said extending of the first spatial scope of analysis is performed by expanding at least one dimension of the bounding box.

6. The computing system of claim 5, wherein said identifying any other ink stroke in the first spatial scope of analysis as extended involves determining whether said any other ink stroke in the first spatial scope of analysis intersects the bounding box.

7. The computing system of claim 1, wherein said identifying any other ink stroke in the first spatial scope of analysis as extended involves determining whether said any other ink stroke in the first spatial scope of analysis as extended intersects an already-existing ink stroke in the first grouping of ink strokes.

8. The computing system of claim 1, wherein said extending of the first spatial scope of analysis expands the first spatial scope of analysis by a fixed amount, independent of context.

9. The computing system of claim 1, wherein the particular gesture is a document-editing gesture, and the operation performed for the particular gesture is a document-editing action.

10. The computing system of claim 1, wherein the operations further include:
identifying spatial information that describes a sequence of positions traversed by the user in drawing the first grouping of ink strokes using the ink capture device;
converting the first grouping of ink strokes into image information;
mapping the spatial information into a first feature embedding; and
mapping the image information into a second feature embedding,
wherein the generating the first classification result is based on a combination of the first feature embedding and the second feature embedding,
wherein said mapping the spatial information into a first feature embedding uses a first neural network provided by the hardware logic circuitry, and
wherein said mapping the image information into a second feature embedding uses a second neural network provided by the hardware logic circuitry.

11. The computing system of claim 1, wherein the operations further include:
identifying spatial information that describes a sequence of positions traversed by the user in drawing the first grouping of ink strokes using the ink capture device;
converting the first grouping of ink strokes into image information;
mapping the spatial information into a first feature embedding; and
mapping the image information into a second feature embedding,
wherein the generating the first classification result is based on a combination of the first feature embedding and the second feature embedding,
wherein the generating the first classification result further comprises:
combining the first feature embedding and the second feature embedding to produce a combined feature embedding;
mapping the combined embedding to an output feature embedding using a neural network provided by the hardware logic circuitry; and
identifying the first classification result based on the output feature embedding.

12. The computing system of claim 11, wherein said combining is performed by concatenating the first feature embedding and the second feature embedding.

13. A method for detecting a gesture that a user performs in a course of interacting with an ink document, comprising:
receiving a first ink stroke most recently drawn by the user using an ink capture device, within the ink document;
identifying a first spatial scope of analysis that is large enough to encompass the first ink stroke;
extending the first spatial scope of analysis;
identifying any other ink stroke that is included in the first spatial scope of analysis as extended, and adding said any other ink stroke to the first grouping of ink strokes
generating a first classification result based on the first grouping of ink strokes;
receiving a second ink stroke drawn by the user, and adding the second ink stroke to a second grouping of ink strokes that initially includes just the second ink stroke;
identifying a second spatial scope of analysis that is large enough to encompass the second ink stroke;
extending the second spatial scope of analysis;
identifying any other ink stroke that is included in the second spatial scope of analysis as extended, and adding said any other ink stroke in the second spatial scope of analysis to the second grouping of ink strokes;
generating a second classification result based on the second grouping of ink strokes, independent of the first classification result; and
performing an operation based on a particular classification result for a case in which the particular classification result indicates that a corresponding grouping of ink strokes contains the particular gesture,
the method defining a stateless algorithm in which the second grouping of ink strokes is processed independently of processing of the first grouping of ink strokes.

14. The method of claim 13,
wherein the first spatial scope of analysis is a bounding box that encompasses the first ink stroke, and
wherein said extending of the first spatial scope of analysis is performed by expanding at least one dimension of the bounding box.

15. The method of claim 13, wherein the method further includes:
- identifying spatial information that describes a sequence of positions traversed by the user in drawing the first grouping of ink strokes using the ink capture device;
- converting the first grouping of ink strokes into image information;
- mapping the spatial information into a first feature embedding; and
- mapping the image information into a second feature embedding,
- wherein the generating the first classification result is based on a combination of the first feature embedding and the second feature embedding,
- wherein said mapping of the spatial information into a first feature embedding uses a first neural network, and
- wherein said mapping of the image information into a second feature embedding uses a second neural network.

16. The method of claim 13, wherein the method further includes:
- identifying spatial information that describes a sequence of positions traversed by the user in drawing the first grouping of ink strokes using the ink capture device;
- converting the first grouping of ink strokes into image information;
- mapping the spatial information into a first feature embedding; and
- mapping the image information into a second feature embedding,
- wherein the generating the first classification result is based on a combination of the first feature embedding and the second feature embedding,
- wherein the generating the first classification result further comprises:
- combining the first feature embedding and the second feature embedding to produce a combined feature embedding;
- mapping the combined feature embedding to an output feature embedding using a neural network; and
- identifying the first classification result based on the output feature embedding.

17. A computer-readable storage medium for storing computer-readable instructions, one or more hardware processors executing the computer-readable instructions to perform operations that comprise:
- receiving a first ink stroke most recently drawn by a user using an ink capture device, within an ink document;
- identifying a first spatial scope of analysis that is large enough to encompass the first ink stroke;
- extending the first spatial scope of analysis;
- identifying any other ink stroke that is included in the first spatial scope of analysis as extended, and adding said any other ink stroke to the first spatial cluster of ink strokes;
- generating a first classification result based on spatial information pertaining to the first grouping of ink strokes and image information pertaining to the first grouping of ink strokes,
- the spatial information describing a sequence of positions traversed by the user in drawing the first grouping of ink strokes using the ink capture device, and
- the image information produced by rendering the first grouping of ink strokes into an image, the image representing the first grouping of ink strokes as pixels;
- constructing a second grouping of ink strokes and identifying an associated second spatial scope of analysis independent of any state established by the first grouping of ink strokes, and generating a second classification result based on the second grouping of ink strokes, independent of the first classification result; and
- sending a particular classification result to an application for performing an operation based on the particular classification result.

18. The computer-readable storage medium of claim 17, wherein the method further comprises repeating said extending the first spatial scope of analysis and identifying any other ink stroke until no additional ink stroke is identified or until another termination condition is reached.

19. The computer-readable storage medium of claim 17,
- wherein the first spatial scope of analysis is a bounding box that encompasses the first ink stroke, and
- wherein said extending of the first spatial scope of analysis is performed by expanding at least one dimension of the bounding box.

20. The computer-readable storage medium of claim 17,
- wherein the method further includes mapping the spatial information into a first feature embedding, and mapping the image information into a second feature embedding, and
- wherein the generating the first classification result operates based on a combination of the first feature embedding and the second feature embedding.

* * * * *